I. M. MILBANK.
Breech Loading Fire Arms.
No. 9,405. Reissued Oct. 12, 1880.
Fig. 1.
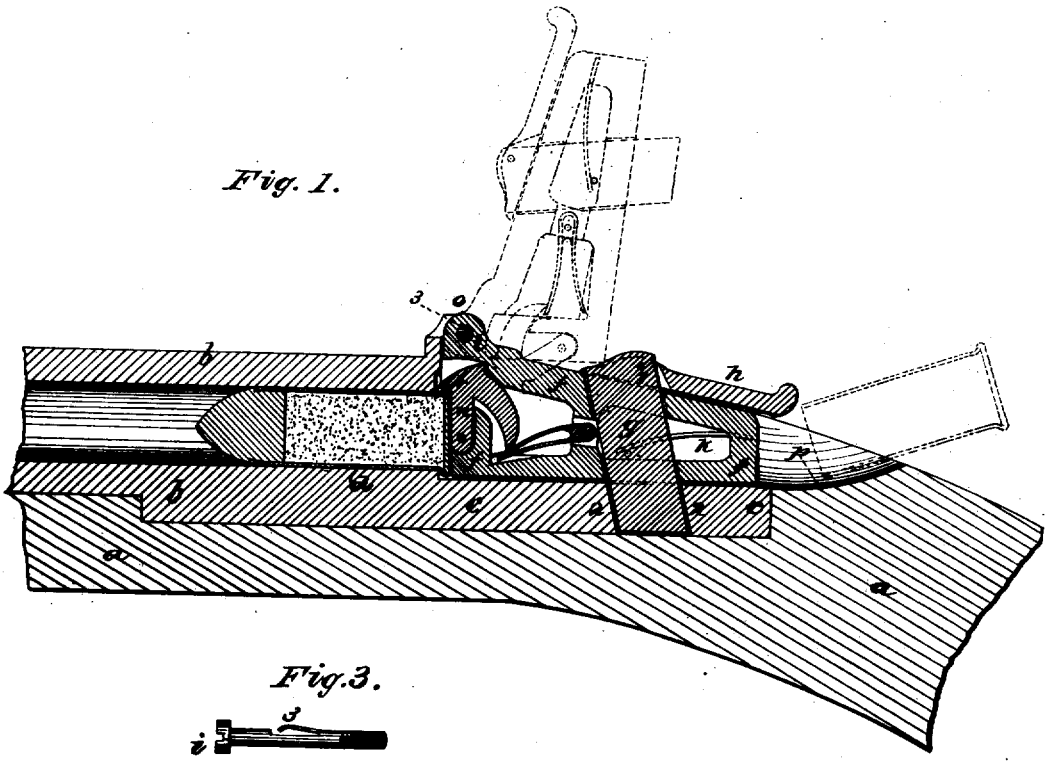
Fig. 3.
Fig. 2.
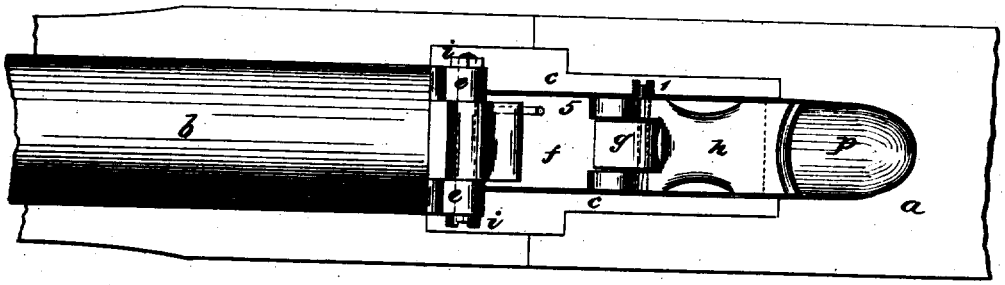
Witnesses:
P. C. Dietrich,
Jno. A. Stockman.
Inventor:
Isaac M. Milbank.
per Leonard E. Curtis,
Atty.
N. PETERS, PHOTO-LITHOGRAPHER, WASHINGTON, D. C.

UNITED STATES PATENT OFFICE.

ISAAC M. MILBANK, OF GREENFIELD HILL, CONNECTICUT.

BREECH-LOADING FIRE-ARM.

SPECIFICATION forming part of Reissued Letters Patent No. 9,405, dated October 12, 1880.

Original No. 52,734, dated February 20, 1866. Application for reissue filed February 14, 1880.

*To all whom it may concern:*

Be it known that I, ISAAC M. MILBANK, of Greenfield Hill, in the county of Fairfield and State of Connecticut, have invented, made, and applied to use a certain new and useful Improvement in Breech-Loading Fire-Arms; and I do hereby declare the following to be a full, clear, and exact description of the said invention, reference being had to the annexed drawings, making part of this specification, wherein—

Figure 1 is a longitudinal section of my improved breech, and Fig. 2 is a plan of the same. Fig. 3 is a view of the spring-pin.

Similar marks of reference denote the same parts.

Breech-loading fire-arms have heretofore been constructed with a swinging breech-pin to close the rear end of the barrel, and various devices, such as spring-catches and forked levers, have been used to draw the cartridge-case out from the barrel.

My invention relates to this class of breech-loading fire-arms; and it consists in a swinging breech-block hinged near the rear end of the barrel, combined with a lever and transverse sliding bolt that receives the recoil when the piece is discharged.

I also make use of a swinging spring-claw that seizes and draws out the cartridge-case as the breech is opened.

In the drawings, *a* is a portion of the stock, and *b* of the barrel, both of any desired size or character.

*c* is a metallic extension or strap, formed with or attached to the rear end of the barrel, the upper portion of which is open, forming a cartridge-receptacle at the rear of and on line with the barrel, so as to guide the metallic cartridge-case with its powder and ball or shot into the rear end of the barrel *b*. The rear end of this cartridge-receptacle is constructed with an upward incline, as shown at *p* in the drawings, for the purpose of turning the empty cartridge-case upward when it is ejected from the gun, so that it may readily pass entirely out of the gun. This metallic cartridge-case *d* is formed with a hollow flange to receive the fulminate, as usual.

*e e* are ears, formed on the upper portion of *c*, or near the rear end of the barrel *b*, through which the hinge-pin *i* for the breech-block *f* passes, and said breech-block is formed at the hinge so as to set beneath these ears *e e* when the breech is closed.

The breech-block *f* carries all the parts that are required for locking itself when closed and for withdrawing the cartridge-case as the breech is opened. Thereby the construction of the piece is greatly facilitated, and in case of damage the breech-block and operative parts are easily removed for repair or for cleaning.

I prefer that the breech-block *f* be made in the form of an open frame, as shown, and across the same, at a slight forward inclination, I introduce the locking-bolt *g* within a mortise formed for its reception. The upper end of the said bolt is fitted with a thumb-lever, *h*, jointed to the bolt *g* by the pin or screw *l*; and I prefer to employ a spring, *k*, to press the bolt downward.

When the breech is turned down the end of the bolt *g* takes against the bottom of the recess in *c*, and slides up in the breech-block *f* as said block is pressed to its place. This movement brings the end of the bolt over a mortise, 2, in the part *c*, and the bolt immediately slides down thereinto. In this position the breech cannot spring open or be drawn back, because the bolt takes the recoil, and the forward end of the breech cannot rise in consequence of the end passing under the ears *e*, which afford additional strength to the hinge-pin and joint.

When the breech is to be opened the thumb or fingers are first pressed under the lever *h*, which, by its leverage, easily draws up the bolt *g*, and when the same is clear of the mortise 2 in *c* the breech can be swung up, giving free access to the rear end of the barrel.

In order to afford sufficient friction to keep the breech from falling when open, I employ a spring, 3, attached upon a flattened portion of the hinge-pin *i*, (see the detached Fig. 3,) said spring acting in the inside of the hole for the said joint-pin in *f*. In the front end of the breech-block *f* is a recess receiving the springing claw *n*, that has a projection at the back portion acted upon by the spring *o*, and a hooked end at 4. When the breech is closed with a cartridge in the gun said claw occupies the recess in the front end of the breech-block *f*, with its hooked end 4 resting a little distance above the cartridge-flange; but as soon as as said breech-block is lifted a short distance the said hooked end catches the flange of the cartridge-case, pulling it out from the rear end of the barrel, and as the opening of the breech-block is continued with sufficient rapidity to swing it out of the way off the cartridge-shell, the claw *n*, swinging out of its recess with an accelerated motion imparted to it by its spring, throws or ejects the cartridge-shell entirely out of the gun. During the first part of the opening movement of the breech-block the spring is compressed, and the claw *n* acts positively upon the cartridge-shell as an extractor or starter, and however tightly such shell may adhere to the chamber of the barrel after firing, it is readily loosened and started out by the leverage applied to the extractor by means of the breech-block. During the latter part of such opening movement the claw, acting upon the shell thus loosened or started, is driven at an accelerated speed by the spring applied to it, and acts as an ejector.

The position of the parts when the breech is open is shown by the dotted lines in Fig. 1, where a cartridge-shell is also shown in the act of going out of the gun.

When the cartridge is placed in the rear of the barrel the said claw *n* yields as the breech is closed and the cartridge forced into the barrel.

The cartridge is to be exploded by a blow from any ordinary cock or hammer acting upon a punch fitted in the breech-block *f*, as at 5.

The head of the pin 1 might be extended so that it will come under an overhanging portion of the hammer and prevent the breech being opened until the hammer is half-cocked, and also prevent the hammer striking until the breech is fully closed.

What I claim, and desire to secure by Letters Patent, is—

1. In combination with the swinging breech-pin *f* and bolt *g*, fitted as specified, the lever *h*, jointed to the upper end of the bolt *g*, and acting to withdraw the same, as specified.

2. The combination, in a breech-loading gun, of a swinging breech-block with a swinging extractor and an accelerating-spring acting in conjunction therewith, substantially as and for purposes set forth.

3. The combination, in a breech-loading gun, of a breech-block swinging upward and forward with a swinging extractor and an accelerating-spring acting in conjunction therewith, substantially as and for the purposes set forth.

4. The combination, in a breech-loading gun, of a swinging extractor and an accelerating-spring acting in conjunction therewith, substantially as and for the purposes set forth.

5. The combination, in a breech-loading gun, of the cartridge-receptacle *c* and the incline *p* with the breech-block *f* and a device ejecting the cartridge-shells in the line of the bore of the gun, substantially as described.

ISAAC M. MILBANK.

Witnesses:

HENRY HINE,

LEONARD E. CURTIS.